Jan. 20, 1959    W. T. GOODING, JR., ET AL    2,869,985
PROCESS FOR PRODUCING ALKALI METAL SILICATES
Filed Oct. 29, 1954
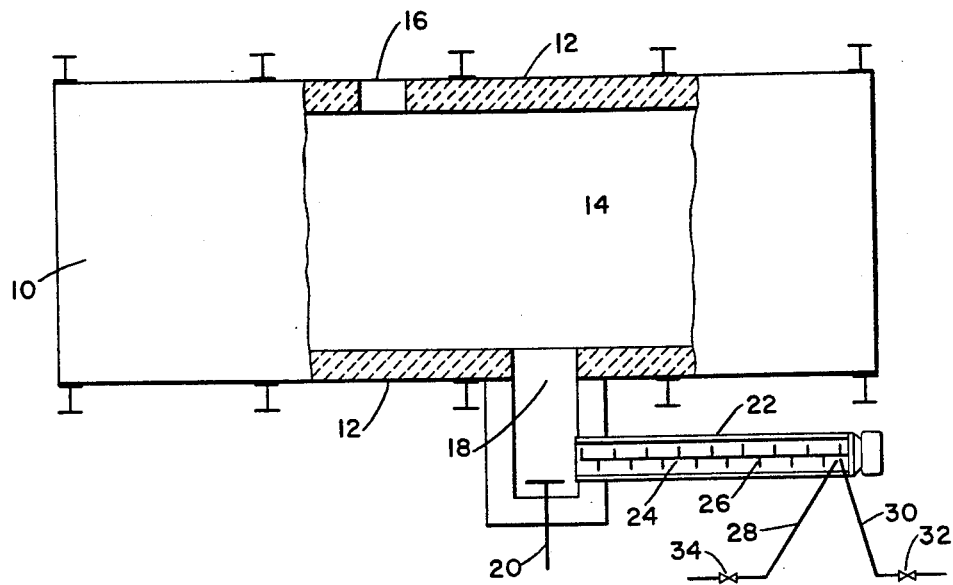
INVENTOR
WILLIAM T. GOODING, JR.
ROBERT C. DANISON
BY Dick M. Warburton
ATTORNEY

United States Patent Office 2,869,985
Patented Jan. 20, 1959

2,869,985

PROCESS FOR PRODUCING ALKALI METAL SILICATES

William T. Gooding, Jr., Painesville, and Robert C. Danison, Olmsted Falls, Ohio, assignors to Diamond Alkali Company, Cleveland, Ohio, a corporation of Delaware Application October 29, 1954, Serial No. 465,653

6 Claims. (Cl. 23—110)

This invention relates to the production of soluble anhydrous alkali metal silicates. More particularly, this invention relates to an improvement in the production of such alkali metal silicates which are formed by the well-known processes of fusing a mixture of silica-containing material and sodium carbonate.

As practiced at present, the fusion processes mentioned above involve batchwise mixing of sand and dry sodium carbonate. The materials are then fed into the charging apparatus from which the mix is delivered to the furnace. In the furnace the mixture undergoes reaction at an appropriate temperature, generally above the fusion temperature of the reaction products. As the reaction continues, products that are formed flow from the furnace as a molten stream and are thereafter treated in one of several ways, depending upon the precise type of product that is desired.

As noted above, this is a well-known conventional process, and it is widely used for the manufacture of various anhydrous soluble silicates.

There are several reasons why sodium carbonate is employed as a component of the reaction of the fusion process; one important reason is its low cost in relation to other materials which might be used to supply the alkali requirement of the mixture. Also, desirably, the fusion process employs dry starting materials and since sodium carbonate is readily available in dry, pulverulent form, it is quite suitable.

Another reason for employing sodium carbonate is the desirable effects which the release of carbon dioxide in the reaction mixture is supposed to have during the general progress of the reaction.

Notwithstanding the wide usage of the sodium carbonate-silica reaction described above, several disadvantages have existed in the process for many years. The difficulties are not such as would be regarded as extremely serious; nevertheless, they are by no means minor, so far as is known, no solution has heretofore been suggested by which they may be avoided.

One of the principal disadvantages of the use of the sodium carbonate-silica fusion process for the production of the more silicious silicates is the quite long time that is required to bring the mixture of reactants to molten condition. As is well-known, the reaction does not proceed to completion below the fusion point of sodium carbonate. Sodium carbonate is a substantially anhydrous material, as supplied by industry, and does not become molten until a temperature of around 850° C. is reached. In commercial scale operations for the formation of many of the silicates, the reaction of all of the silica and soda ash is not complete within a commercially satisfactory period until both of the materials have reached temperatures much higher than 850° C.

Still another difficulty that is encountered in the sodium carbonate-silica fusion process arises because of the occurrence of what is known to the art as "sand caps." Sand caps occur because of irregularities in the mixing of sodium carbonate and sand, i. e., stratification of reactants with the reaction mass. If at some time during the mixing operation some of the sand which is being fed to the mixer does not receive its counterpart of sodium carbonate, this quantity of alkali-starved sand continues through the mixer to the furnace but never becomes mixed with the proper amount of sodium carbonate. The alkali-starved mixture is discharged on to the molten mass of reaction products in the furnace, and does not become associated with it so as to end up as a fully reacted part of the ultimate product. Instead, it appears in the final product as individual sand granules and to this extent impairs the product.

In addition to the sodium carbonate-sand fusion process, it is also known to produce various silicates by mixing caustic soda with silica-containing material. In such processes, which are not generally classed as wet methods, sodium hydroxide is employed in concentrations ranging from materials that are just solid at slightly below room temperature to materials that are completely anhydrous. This type of process, however, does not enjoy usage to any marked extent in commercial operations.

The anhydrous form of caustic soda is not employed primarily because of its comparatively high cost, which arises by reason of the large quantity of heat that is required to dehydrate a sodium hydroxide solution. Also, for good results, anhydrous caustic soda should be delivered to the mixer in molten condition and, for this purpose, special heating and storage equipment is required. While there is no particular difficulty in supplying anhydrous caustic as a molten stream, such equipment adds to the cost of the process and there is a considerable heat loss from the equipment and in the mixing trough which adds to the cost of the process.

On the other hand, a sodium hydroxide solution, for example, 50–73% NaOH content, is not suitable because of the violent character of the reaction that takes place when such sodium hydroxide solutions are delivered to the furnace. It will be quite readily understood that the exposure of water-containing materials to the reaction mass at temperatures employed in fusion processes causes the water to be evaporated suddenly and at substantially all points in the reaction mass. As a result of this, a serious steaming problem results and the molten reaction mass is caused to spatter continuously and violently in and about the furnace.

A possible additional disadvantage in employing aqueous sodium hydroxide solutions as the sole alkali is that there is a very strong tendency for liquid-solid phase separation in the caustic soda-sand mixture, and, therefore, a greater tendency to variations in the composition of the finished product.

In consequence of these disadvantages, the use of aqueous caustic soda has been avoided in the fusion type of process leading to the formation of soluble anhydrous alkali metal silicates.

So far as is known, the difficulties of the sodium carbonate-silica fusion process and the caustic soda-silica fusion process have not been overcome, notwithstanding the fact that industry for many years has employed the sodium carbonate-silica fusion process.

It has now been discovered that all of the foregoing disadvantages can be overcome and that soluble anhydrous alkali metal silicates heretofore prepared by the fusion process employing sodium carbonate and silica-containing materials can be advantageously prepared, in accordance with the present invention, by employing a three-part mixture including sodium carbonate, a silica-containing material and liquid caustic soda.

Generally stated, the process of the invention contemplates supplying the $Na_2O$ requirements of the well-known fusion process by delivering caustic soda as a liquid stream, in quantity calculated to provide up to about sixty percent of the desired Na₂O content of the silica-sodium carbonate mixture, the quantity of sodium carbonate being reduced accordingly, and, thereafter, intermixing the three components and delivering them to the furnace for reaction in the conventional manner.

The manufacture of the various silicates contemplated herein according to the process of the invention may be most advantageously undertaken in conjunction with the manufacture of caustic soda, or other alkali metal hydroxide. This is because the caustic soda, for example, may be supplied to the process of the invention in molten form from the production stream of a caustic soda manufacturing operation, unencumbered by additional costs that are attached to it because of shipping and handling when it is purchased on the open market. The fact that the caustic soda is supplied directly from production to the process in molten condition also is a favorable factor costwise since, where caustic soda is purchased on the open market and employed in processes, it usually must be heated to the liquid state. However, the process of this invention may be undertaken advantageously regardless of the supply of caustic soda as will be more fully appreciated from the description of the invention.

In the practice of the present invention, a mixture of dry sodium carbonate and sand are delivered to the receiving end of a mixing trough, such as a pug mill. Liquid caustic soda is discharged into the trough at about the same point as is the sodium carbonate-sand mixture, and at a proportioned rate. Due to the fact that the caustic soda is liquid, it is easily dispersed substantially immediately throughout the mass of silica and sodium carbonate. As a result of this, the dusting problem mentioned above is substantially eliminated.

In contrast to the high temperature needed for starting the reaction in the sodium carbonate-silica fusion process, reactions with sodium hydroxide start at a much lower temperature because of the fact that all forms of sodium hydroxide become molten at below about 320° C., the melting point for substantially anhydrous caustic. A commercial 73% sodium hydroxide solution melts at about 63° C. (145° F.). A commercial 50% solution of sodium hydroxide melts at about 12° C. (54° F.) and, therefore, may actually be liquid at room temperature. Thus, the initiation of the reaction of silica and caustic where sodium hydroxide solutions are employed takes place at a much lower temperature than is the case with the straight sodium carbonate-silica reaction. Of course, where a given product requires higher temperatures for its formation, i. e., one of the more silicious silicates, and where it is the practice to permit such product to flow from the furnace in molten condition, subsequently, in the furnace, a higher temperature than the initial reaction temperature will be necessary, but this does not in any way detract from the relative savings in time which is accomplished by initiating the reaction at the lower temperature; rather, the relative savings in time is reflected in the increased rate of production.

In the process of this invention, since the sodium hydroxide is liquid, and is present in comparatively large proportion, a more intimate, and more uniform, mixture of alkali and silica is obtained than in processes employing either caustic soda or soda ash alone as the source of alkali. Thus, depending upon the quantity of liquid sodium hydroxide that is employed, the over-all reaction time for forming the desired silicate may be reduced quite advantageously. It is believed that the sodium carbonate may also react more readily because of the presence of the molten caustic, although it is not possible to state this as a definite conclusion at this time.

Additionally, because of the more effective mixing of sand and alkali, in operations conducted according to this invention, the problem of sand caps is eliminated. If, while proceeding according to this invention, it occurs that the sodium carbonate feed is temporarily interrupted, no problem of sand caps arises, because the molten sodium hydroxide continues to flow to the mixing trough, thus providing a substantial amount of a liquid alkaline medium for mixing the raw silica. As a result of this, at the time the mixture of silica and liquid sodium hydroxide reaches the furnace, it does not float as a mass of sand on the molten reaction mixture in the furnace but, rather, it associates itself with the reaction mixture, and during the fusion step in the furnace, it reacts to form a molten silicate in the same manner as does the mixture of caustic, sodium carbonate and silica. In such instance, a small portion of the mass may analyze to a slightly lower alkali:silica ratio; however, the product is a soluble silicate and, therefore, the batch is not significantly impaired. Thus, the problem of unreacted silica occurring in the reaction products from time to time is for practical purposes substantially eliminated.

It should be mentioned that the present process does not create a steaming and spattering problem in the furnace, as may now be seen.

At the time the mixture of sand and alkali is initially formed in the receiving end of the feed trough or pug mill, it is rather wet; however, the liquid caustic is quite hot, desirably at or above the boiling point of water, and it is readily adsorbed by the soda ash due to the large surface area exposed by the soda ash particles which are being agitated by the mixer as the damp mass moves to the furnace. Consequently, during the passage of the mixture through the mixing trough, there is an apparent loss of water, possibly because of hydration of the soda ash, accompanied by a transition from a pasty mixture to a granular solid. Consequently, when the mixture reaches the furnace, there is a comparatively slow evolution of steam and no problem of spattering of the molten mixture is encountered. It will be appreciated by those skilled in the art that where the sodium hydroxide is quite dilute, or even in cases where an inordinate amount of caustic is supplied in the form of, for example, 73% caustic, that is, a 73% sodium hydroxide solution, the problem of the boiling of the fused mixture in the furnace and the spattering problem may become noticeable. However, within the limits suggested herein, and viewing the matter practically, this possible problem is entirely avoided.

Preferably, the invention contemplates that sodium hydroxide solutions which are solid at room temperature will be employed, but, of course, any sodium hydroxide solution regardless of its dilution may suitably be employed if provision is made to reduce the water content of the mixture prior to the time that it reaches the furnace. Thus, the concentration of the caustic soda solutions employed in the method of the present invention may be from as low as about 10% up to about 70% or higher if the less hydrous material is desirable in a given operation. It is not believed that silicate plants as now set up in commercial operations throughout the industry are such as to permit the evaporation of more water during the mixing step in the trough than is contained in a sodium hydroxide solution of about 50%, especially where as much as one-half of the Na₂O for the process is supplied by caustic soda. Accordingly, sodium hydroxide solutions of about 50% NaOH or more, up to and including anhydrous caustic soda, are contemplated for use in the present invention. More especially useful and preferred in the present invention have been found to be sodium hydroxide solutions containing about 70–74% NaOH.

Those skilled in the art will appreciate that any quantity of sodium hydroxide may be mixed with the silica and sodium carbonate and still realize some of the benefits of the present invention; however, in general, it has been found preferable, especially where 73% sodium hydroxide solutions or more dilute solutions are employed, to proportion the sodium hydroxide solution in relation to sodium carbonate so that the former supplies not more than about 60%, preferably about 50% or less of the $Na_2O$ requirements of the reaction, which gives the desired product. Where a substantially higher percentage of $Na_2O$ than 60% is supplied by, for example, 73% sodium hydroxide, it is found that an undesirable boiling action takes place in the reaction mass in the furnace, which action is a direct result of the quantity of water being delivered to the molten mass. However, where a more concentrated sodium hydroxide solution or anhydrous caustic is employed, this problem may be disregarded entirely and higher percentages of $Na_2O$ may be supplied by the caustic soda component of the mixture than 60% up to a point where it is found that the advantages of the invention disappear. Therefore, it will be understood that the invention is not to be limited to any particular proportion of the $Na_2O$ requirement of the mixture which is to be supplied from the caustic.

Generally, it is believed that those who will manufacture silicates in accordance with the teachings of this invention will find it to be to some extent advantageous to select the caustic component on the basis of its availability, and the quantity of heat which their establishment permits conveniently and economically to be diverted to the step of heating the caustic to molten condition. For example, it is envisioned that some may utilize waste heat in their establishment for the purpose of converting solid caustic to the liquid state. If sufficient waste heat is available to convert anhydrous caustic to liquid form, then it is quite possible that it would be preferred to employ anhydrous caustic or a sodium hydroxide solution of more than 75% NaOH.

As noted above, the process of the present invention is applicable to the preparation of various soluble alkali metal silicates. Thus, the invention is applicable to the preparations of alkali orthosilicates, metasilicates, sesquisilicates, and silicates wherein the ratio of $SiO_2$ to sodium oxide is greater than 1 to 1 as in the case of the soluble silicate glasses, for example, $Na_2O:3.3SiO_2$.

For the purpose of providing a specific working embodiment of the process of the present invention in its various aspects, hereinafter exemplary material is set forth which is directed to the preparation of the silicate composition of the chemical formula $Na_2O:3.3SiO_2$.

Before proceeding with the exemplary material, however, it is desired to refer to the drawing in connection with the invention so that the invention may be more clearly understood as the exemplary material is considered.

The drawing illustrates the conventional type of fusion furnace, as viewed from above, with parts broken away to show internal structure, and including the feed trough thereto, the feed channel and the trough wall being in plan view. In the drawing, numeral 10 denotes a furnace having walls 12 and a floor 14, which form the reaction tank of the furnace. Numeral 16 denotes an outlet, or tapout hole, for reacted materials, and numeral 18 denotes a channel opening through which materials to be reacted are fed, commonly referred to as the "dog house." The mixture of reactants is moved from the channel opening 18 into the reaction tank of the furnace by means of rabble 20. Numeral 22 denotes generally the mixing and advancing apparatus comprising a trough 24 having therein a paddle mixer 26, this apparatus being of the well-known type referred to as a pug mill. As can be seen, trough 22 leads to channel opening 18 of the furnace at which point materials to be reacted are deposited in the channel, and moved into the melting tank by rabble 20 as a result of the advancing action of the paddle mixer.

Numerals 28 and 30 denote, respectively, feed lines for the sodium hydroxide and the mixture of silica-containing material with soda ash, in which lines suitable proportional flow valves 32 and 34 are positioned. The feed lines, of course, are connected to suitable sources of supply not considered necessary to be illustrated.

The operation of the apparatus in relation to the process is quite simple. The materials to be reacted are fed in their proper proportioned quantities to the trough of the pug mill. With the mixer in operation, the materials which are fed to it are intermixed and advanced along the trough and finally discharged into the channel opening and then into the reaction zone of the furnace, which is maintained at reaction temperature by any suitable means, as by gas or oil fired burners. The operation may be continuous, in which event there is a pool of charge in the furnace at all times undergoing reaction. As the new material is delivered to the furnace, fully reacted products are displaced and discharged thru the outlet, the quantity of feed material being related to the volume of the reaction space in a manner to assure sufficient residence time in the furnace for complete reaction.

In order that the invention may be more completely understood, it is desired to set forth a specific example of the manner in which the invention herein described may be carried into effect:

*Example I*

Mixtures of sand, soda ash, and 50% aqueous solution of sodium hydroxide are prepared at room temperature (approximately 25° C.) in a mixer providing a kneading action, the weight proportions of each of the ingredients being shown in the tabulation below:

| | Silica Sand, parts | Soda Ash, parts | 50% Aqueous Caustic Soda, parts | Percent of $Na_2O$ Replaced by Caustic Soda |
|---|---|---|---|---|
| 1 | 1,312 | 550 | 211 | 20 |
| 2 | 1,312 | 482 | 315 | 30 |
| 3 | 1,312 | 413 | 420 | 40 |
| 4 | 1,312 | 344 | 525 | 50 |

($Na_2O:SiO_2$ ratio = 1:3.7)

The mixtures have the characteristics shown in the following tabulation:

(1) Damp, entirely free from dust
(2) Same as 1
(3) Readily agglomerates forming lumps
(4) Pasty, thick slurry Each of the above mixtures is charged to a melting furnace containing molten silicate glass of approximately the same $Na_2O:SiO_2$ ratio, at a temperature of about 1200° C. Mixtures 1, 2, and 3, melt quietly and completely into the silicate glass in the furnace. With the mixture numbered 4 there is a noticeable evolution of water vapors, although the action is not violent.

*Example II*

The purpose of the following experiments is to show the uniformity of dispersion of reactants throughout the mixtures, prepared in accordance with the invention, as well as the rapidity with which the reactants are consumed to give a silicate glass of uniform composition.

One hundred parts of each of two mixtures ($Na_2O:SiO_2=1:3.7$) containing sand and soda ash, and sand, soda ash, and 50% aqueous caustic soda, respectively, the caustic soda replacing 1% of the $Na_2O$ requirement for the second mixture, are placed in piles on a sheet of heavy paper. The paper is then dropped ten times from a height of about one foot onto a stone-topped table, to cause the piles to become flattened and to cause separation of sand and alkalis. Three samples are taken across each pile, leached with water to remove the alkali; the washed material is dried and weighed to determine the amount of material leached out. The difference between the maximum and minimum amounts of alkali removed, as a percentage of the sample, is 4.9% for the sand-soda ash mixture, and 0.8% for the sand-soda-caustic soda mixture.

The remaining portion of each of these mixtures is reblended to make them as nearly uniform as possible. The mixtures are then heated at about 1370° C., for 15 minutes, and the melts thereby obtained are examined after cooling to form a solid glass.

The glass obtained from the sand-soda ash mixture contains many floc-like spots, apparently of unreacted silica, whereas the glass obtained from the sand-soda ash-caustic soda mixture contains very few of these spots; moreover, in the molten condition, the glass obtained from the sand-soda ash-caustic soda mixture is more fluid than that obtained from the sand-soda ash mixture.

*Example III*

6.135 lbs. of sand, 1,635 lbs. of dense soda ash and 1,670 lbs. of hot 73% aqueous sodium hydroxide solution are continuously delivered to the paddle mixer of the apparatus shown on the attached drawing, the paddles of which mixer are turning at about 70 R. P. M.; the sand, soda ash, and sodium hydroxide solution are fed to the mixer in proportioned amounts of about 47.19 lbs. per minute, 12.58 lbs. per minute and 12.85 lbs. per minute, respectively. The 73% sodium hydroxide solution, during the period of its feeding and at the time it is discharged into the trough is maintained at a temperature of about 200° F. to 212° F. The mixture initially is quite wet and approaches the slurry state; however, by the time it has advanced to the discharge point of the trough, it is, at most, a damp mass, tending to fall apart into separate granules of the reactants. The materials are mixed in the paddle mixer and delivered to the furnace which is at reaction temperature, namely, about 1300° C. The entire quantity of materials is completely reacted and collected from the discharge end of the furnace within a comparatively short time. Analysis of the product reveals it to be a substantially anhydrous soluble sodium silicate having the emperical chemical formula $Na_2O.3.3S.O_2$.

During the course of this exemplary operation, no difficulties whatever are encountered. More specifically, the dusting problem is completely eliminated, no significant steaming problem is observed and spattering or boiling in the furnace to any extent is not present. Also, as those skilled in the art will appreciate, the process time that is involved in completing the reaction of the quantities of materials employed in this exemplary operation is substantially less than is involved in producing a corresponding quantity of product by the reaction of sand and soda ash.

The term "silica-containing material" employed herein refers to a solid, reactive material, and includes silica itself and the solid water-glasses wherein the ratio of $SiO_2$ exceeds that of $Na_2O$, for example, the water glasses wherein the ratio of $Na_2O$ to $Si_2O$ is from about 1.2–4. Of course, still other similar sodium silicates may be employed, as those skilled in the art will understand. Where silica is employed, it may be in any form of suitable fineness to promote the reaction and it may be anhydrous or hydrated.

Although the invention has been described particularly in terms of the commercially important sodium silicates, it will be understood that all of the alkali metal silicates may similarly be prepared by simple modifications of the process. Thus, the invention may be applied to prepare the potassium, lithium, cesium, rubidium, or sodium silicates.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for forming alkali metal silicate compositions of a given silica:alkali metal oxide ratio, which includes the steps of forming a mixture containing silica, alkali metal carbonate, and liquid alkali metal hydroxide in a concentration of at least about 10%, the ingredients being proportioned to provide said given silica:alkali metal oxide ratio, the quantity of said alkali metal hydroxide being predetermined in relation to the other reactants to provide not more than about 60% of the alkali requirement of the reaction product, subjecting said mixture to agitation at a temperature such that said alkali metal hydroxide is maintained in the liquid state, continuing agitation of said mixture until said mixture assumes the property of a damp-to-substantially dry granular mass, delivering said mass to a furnace wherein said mass is heated to temperature above that at which fusion of the reaction product and substantial completion of the reaction of said ingredients takes place, and recovering the reaction product.

2. A process for forming silicates of a given silica:sodium oxide ratio, comprising forming a mixture containing silica, soda ash, and liquid sodium hydroxide in a concentration of at least about 10%, as the silicate-forming ingredients, said ingredients being proportioned to provide said given silica:sodium oxide ratio, the quantity of said sodium hydroxide being predetermined in relation to the other reactants to provide not more than about 60% of the $Na_2O$ requirement of the reaction product, subjecting said mixture to agitation at a temperature such that said sodium hydroxide is maintained in the liquid state for a time sufficient to provide a uniform mixture having the property of a pasty-to-substantially dry granular mass, subjecting said mixture to fusion and substantial completion of the reaction of said ingredients at a temperature above the fusion temperature of said silicate of said silica:sodium oxide ratio, and recovering the product thus formed.

3. A process for forming soluble substantially anhydrous sodium silicate of a given silica:sodium oxide ratio, which includes the steps of delivering a mixture of silica, sodium carbonate, and hot liquid sodium hydroxide in a concentration of at least about 10%, to a mixing-advancing zone, the proportion of ingredients of said mixture being sufficient to provide said given silica:sodium oxide ratio, the quantity of liquid sodium hydroxide employed being not more than about 60% of the $Na_2O$ requirements of the reaction product of the process, agitating said mixture while simultaneously advancing said mixture in said zone to a furnace, the agitation being carried out at a temperature such that said liquid sodium hydroxide is maintained in the liquid state, until a substantially homogeneous mass of said ingredients is obtained, said mixture then being delivered to the furnace as a pulverulent mass, subjecting said mass to fusion and substantial completion of the reaction of said ingredients in said furnace at a temperature above the fusion temperature of said silicate of said silica:sodium oxide ratio, and removing the reaction products from the furnace.

4. A process for forming alkali metal silicate compositions of a given silica:alkali metal oxide ratio, which includes the steps of forming a mixture containing silica, alkali metal carbonate, and aqueous alkali metal hydroxide containing not less than about 50% by weight of such hydroxide, the ingredients being proportioned to provide said given silica:alkali metal oxide ratio, the quantity of said alkali metal hydroxide being predetermined in relation to the other reactants to provide not more than about 60% of the alkali requirement of the reaction product, subjecting said mixture to agitation at a temperature such that said alkali metal hydroxide is maintained in the liquid state, continuing agitation of said mixture until said mixture assumes the property of a damp- to substantially-dry granular mass, delivering said mass to a furnace wherein said mass is heated to temperatures above that at which fusion of the reaction product and substantial completion of the reaction of said ingredients takes place, and recovering the reaction product.

5. A process for forming silicates of a given silica: sodium oxide ratio, comprising forming a mixture containing silica, soda ash, and an aqueous sodium hydroxide containing not less than about 50% by weight of sodium hydroxide, as the silicate-forming ingredients, said ingredients being proportioned to provide said given silica:sodium oxide ratio, the quantity of said sodium hydroxide being predetermined in relation to the other reactants to provide not more than about 60% of the $Na_2O$ requirement of the reaction product, subjecting said mixture to agitation at a temperature such that said sodium hydroxide is maintained in a liquid state for a time sufficient to provide a uniform mixture having the properties of a pasty- to substantially-dry granular mass, subjecting said mixture to fusion and substantial completion of the reaction of said ingredients at a temperature above the fusion temperature of said silica:sodium oxide ratio and recovering the product thus formed.

6. The process for forming soluble, substantially-anhydrous sodium silicate of a given silica:sodium oxide ratio, which includes the steps of delivering a mixture of silica, sodium carbonate, and hot aqueous sodium hydroxide containing not less than about 50% by weight NaOH to a mixing-advancing zone, the proportion of ingredients of said mixture being sufficient to provide said given silica:sodium oxide ratio, the quantity of liquid sodium hydroxide employed being not more than about 60% of the $Na_2O$ requirements of the reaction product of the process, agitating said mixture while simultaneously advancing said mixture in said zone to a furnace, the agitation being carried out at a temperature such that said liquid sodium hydroxide is maintained in the liquid state, until a substantially homogenous mass of said ingredients is obtained, said mixture then being delivered to the furnace of a pulverulent mass, subjecting said mass to fusion and substantial completion of the reaction of said ingredients in said furnace at a temperature above the fusion temperature of said silicate or said silica: sodium oxide ratio, and recovering the reaction product from the furnace.

References Cited in the file of this patent

UNITED STATES PATENTS

| | | |
|---|---|---|
| 1,357,183 | Phillips et al. | Oct. 26, 1920 |
| 2,083,545 | Burkhart et al. | June 15, 1937 |
| 2,219,646 | Beecher | Oct. 29, 1940 |
| 2,230,909 | Riggs et al | Feb. 4, 1941 |
| 2,644,742 | Davison | July 7, 1953 |

FOREIGN PATENTS

| | | |
|---|---|---|
| 299,763 | Great Britain | Mar. 14, 1929 |

UNITED STATES PATENT OFFICE
CERTIFICATE OF CORRECTION

January 20, 1959

Patent No. 2,869,985

William T. Gooding, Jr., et al.

It is hereby certified that error appears in the printed specification of the above numbered patent requiring correction and that the said Letters Patent should read as corrected below.

Column 5, line 33, for "than 75%" read -- than 74% --; column 7, line 2, for "sand-soda-caustic soda" read -- sand-soda ash-caustic soda --; line 40, after the word "formula", strike out "Na$_2$O.3.3S.O$_2$." and insert instead --Na$_2$O.3.3SiO$_2$. --; line 57, for "1.2-4." read -- 1:2-4. --.

Signed and sealed this 1st day of September 1959.

(SEAL)

Attest:

KARL H. AXLINE
Attesting Officer

ROBERT C. WATSON
Commissioner of Patents